(12) United States Patent
Hewitt

(10) Patent No.: US 7,451,337 B1
(45) Date of Patent: Nov. 11, 2008

(54) GUARANTEED EDGE SYNCHRONIZATION FOR MULTIPLE CLOCKS

(75) Inventor: Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 979 days.

(21) Appl. No.: 10/266,152

(22) Filed: Oct. 7, 2002

(51) Int. Cl.
*G06F 1/12* (2006.01)
*G06F 1/04* (2006.01)

(52) U.S. Cl. ................................ 713/400; 713/600
(58) Field of Classification Search ............... 713/400, 713/600; 714/600
See application file for complete search history.

(56) References Cited

U.S. PATENT DOCUMENTS

| | | | | |
|---|---|---|---|---|
| 5,450,458 A | * | 9/1995 | Price et al. ................. | 375/356 |
| 5,606,276 A | * | 2/1997 | McClintock ................. | 327/263 |
| 5,744,991 A | * | 4/1998 | Jefferson et al. ............. | 327/158 |
| 6,047,383 A | * | 4/2000 | Self et al. ..................... | 713/503 |
| 6,208,180 B1 | | 3/2001 | Fisch et al. | |
| 6,268,749 B1 | | 7/2001 | Fisch et al. | |
| 6,516,362 B1 | | 2/2003 | Magro et al. | |

* cited by examiner

*Primary Examiner*—Rehana Perveen
*Assistant Examiner*—Stefan Stoynov
(74) *Attorney, Agent, or Firm*—Meyertons Hood Kivlin Kowert & Goetzel, P.C.; Erik A. Heter (57) ABSTRACT

A method and apparatus for guaranteeing clock edge synchronization is disclosed. In one embodiment, a system for synchronizing clock signals includes a clock unit and a synchronization unit. Both the clock unit and the synchronization unit may be configured to receive a reference clock signal. The clock unit may be configured to drive a plurality of domain clock signals to various clock domains. The synchronization unit may be configured to assert a synchronization pulse once every N reference clock cycles. Clock edges of the domain clock signals may be aligned with each other responsive to asserting the synchronization pulse.

48 Claims, 5 Drawing Sheets

GUARANTEED EDGE SYNCHRONIZATION FOR MULTIPLE CLOCKS

BACKGROUND OF THE INVENTION

1. Field of the Invention

This invention relates to the clocking of electronic circuits, and more particularly, to the synchronization of multiple clock signals.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

With multiple processors, multiple I/O devices, and multiple I/O bridges may come multiple clock domains. Often times, the clock frequencies required for operation of the processor, the I/O bridges, and the peripheral devices (and buses that couple these elements together) are different. Furthermore, it is often times possible the within a processor or an I/O bridge, multiple functional units may be present which require differing clock frequencies. In such cases, multiple clocks may be provided, with the clock signals being routed to their respective domains.

In systems having multiple clock domains, it is often necessary to transmit information from one domain to another. However, this is not a straightforward process when the clock frequencies from one domain to another are different. Often times a technique known as handshaking is used. Handshaking may involve a communication between two clock domains wherein an agreement is reached on when data may be sent. This may ensure that a faster domain does not overwhelm a slower domain by exceeding the maximum bandwidth of the slower domain. Similarly, handshaking may ensure that a slower device may utilize as much of the bandwidth of a faster domain as possible when the faster domain is receiving information.

Regardless of the technique used to transfer information between clock domains having different clock speeds, the relationship between the respective clock signals is an important consideration. In particular, it may be important to know the relationship between the rising or falling edges of the respective clock signals. Often times, it is difficult to ascertain this relationship. Thus, it may not always be possible to transmit information while utilizing the maximum available bandwidth on a link between two different clock domains.

SUMMARY OF THE INVENTION

A method and apparatus for guaranteeing clock edge synchronization is disclosed. In one embodiment, a system for synchronizing clock signals includes a clock unit and a synchronization unit. Both the clock unit and the synchronization unit may be configured to receive a reference clock signal. The clock unit may be configured to drive a plurality of domain clock signals to various clock domains. The synchronization unit may be configured to assert a synchronization pulse once every N reference clock cycles. Clock edges of the domain clock signals may be aligned with each other responsive to asserting the synchronization pulse.

In one embodiment, a system for synchronizing clock signals may include a plurality of phase locked loops (PLLs), although embodiments having delay locked loops (DLLs) are possible and contemplated). Each of the PLLs may include a divide-by-n counter. Each PLL may be configured to produce a domain clock signal that is greater or less than the frequency of reference clock signal. When the synchronization pulse is asserted, it may cause the divide-by-n counters in each of the PLLs to be reset. Following the reset, each of the PLLs may achieve a lock on the next rising edge of the reference clock signal. Thus, at the next rising edge of the reference clock signal, the rising edge of each of the domain clock signals will be aligned with each other, as well as being aligned with the reference clock signal.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
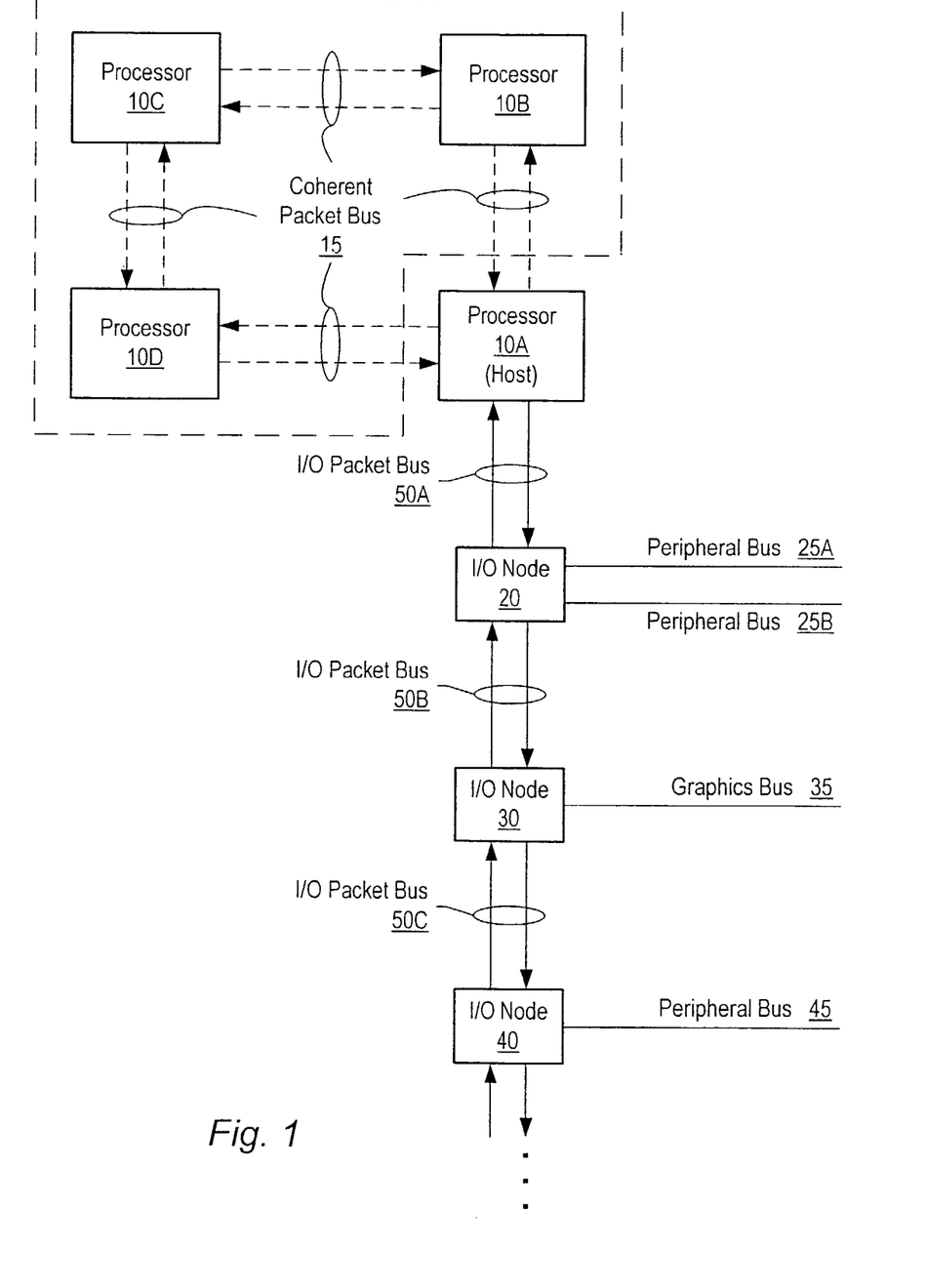
FIG. 1 is a block diagram of one embodiment of a computer system having multiple clock domains.

Turning now to FIG. 1, a block diagram of one embodiment of a computer system is shown. The computer system includes processors 10A-10D each interconnected by a coherent packet bus 15. Each section of coherent packet bus 15 may form a point-to-point link between each of processors 10A-D. While four processors are shown using point-to point links it is noted that other numbers of processors may be used and other types of buses may interconnect them. The computer system also includes three I/O nodes numbered 20, 30 and 40 each connected together in a chain by I/O packet buses 50B and 50C respectively. I/O packet bus 50A is coupled between host node/processor 10A and I/O node 20. Processor 10A is illustrated as a host node which may include a host bridge for communicating with I/O packet bus 50A. Processors 10B-D may also include host bridges for communication with other I/O packet buses (not shown). The communication links formed by I/O packet bus 50A-C may also be referred to as a point-to-point links. I/O node 20 is connected to a pair of peripheral buses 25A-B. I/O node 30 is connected to a graphics bus 35, while I/O node 40 is connected to an additional peripheral bus 45.

Processors 10A-10D are each illustrative of, for example, an x86 microprocessor such as an Athlon™ microprocessor. In addition, one example of a packet bus such as I/O packet bus 50A-50C may be a non-coherent HyperTransport™. Peripheral buses 25A-B and peripheral bus 45 are illustrative of a common peripheral bus such as a peripheral component interconnect (PCI) bus. Graphics bus 35 is illustrative of an accelerated graphics port (AGP), for example. It is understood, however, that other types of microprocessors and other types of peripheral buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

During operation, I/O node 20 and 40 may translate PCI bus transactions into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. As used herein, "upstream" refers to packet traffic flow in the direction of the host bridge of processor 10A and "downstream" refers to packet traffic flow in the direction away from the host bridge of processor 10A. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. Since I/O node 20 may not forward packets to a peripheral device on peripheral bus 25 from downstream, the packets are transmitted upstream to the host bridge of processor 10A. The host bridge of processor 10A may then transmit the packets back downstream with a Unit ID of the host bridge of processor 10A until I/O node 20 recognizes and claims the packet for the peripheral device on peripheral bus 25. I/O node 20 may then translate the packets into peripheral bus transactions and transmit the transactions to the peripheral device on peripheral bus 25.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, to preserve the ordering rules of the various buses that may be connected to an I/O node, the I/O node may provide transaction reordering as well as packet buffering. The I/O node may also include control logic which controls the flow of packets into and out of the tunnel by both forwarded and injected traffic.

Figure 2:
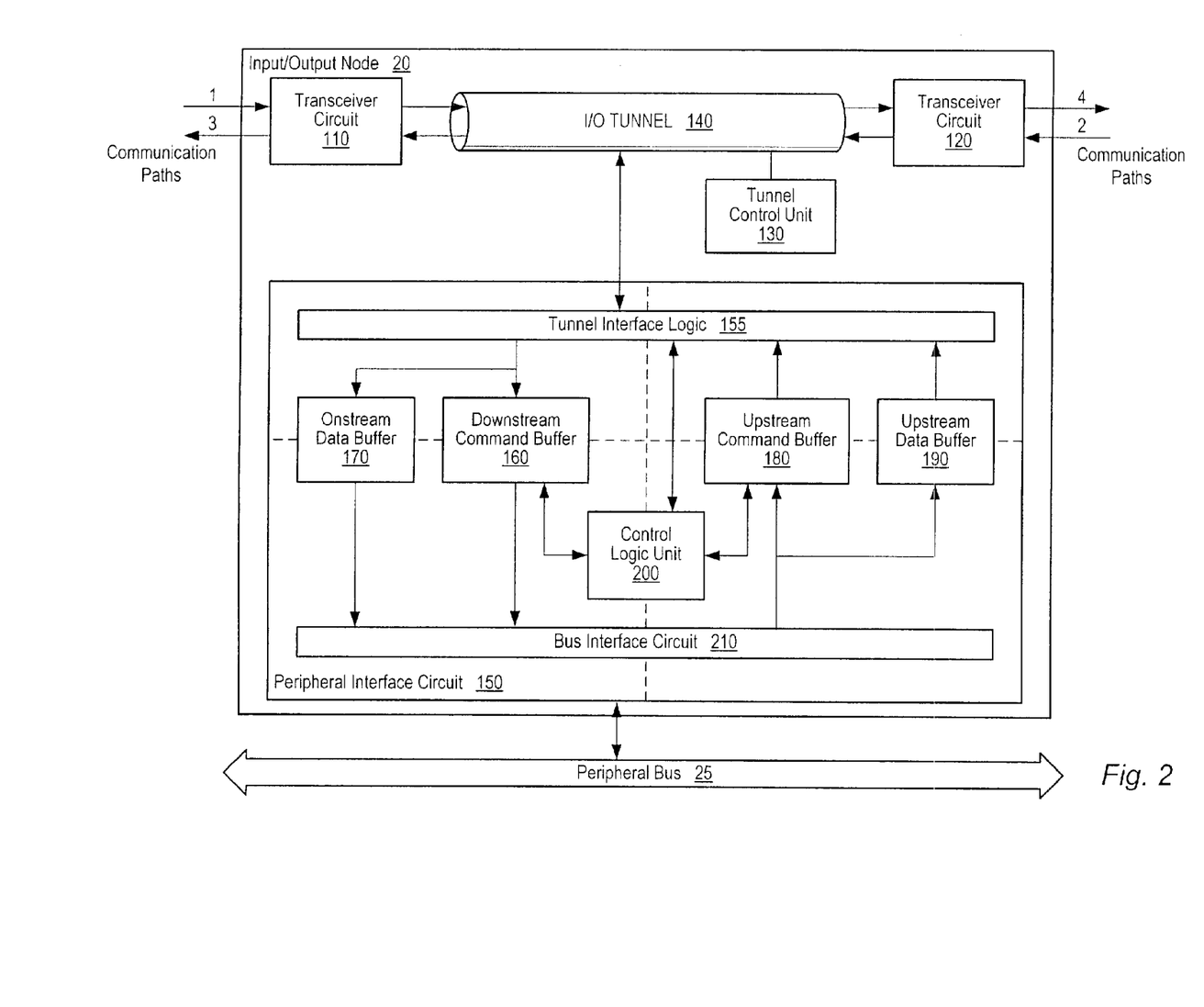
FIG. 2 is a block diagram of one embodiment of an I/O node having multiple clock domains.

Referring to FIG. 2, a block diagram of one embodiment of an input/output (I/O) node is shown. This particular description will refer to I/O node 20 for simplicity, but it should be noted that the description may apply as well to any of the I/O nodes shown in FIG. 1. Input/output node 20 includes an upstream packet bus interface and a downstream packet bus interface, implemented in this embodiment as transceiver circuit 110 and transceiver circuit 120, respectively. Transceiver circuits 110 and 120 are coupled together through an I/O tunnel 140. Transceiver circuits 110 and 120 may each include a transmitter and a receiver (not shown). The transmitters and receivers may be connected through I/O tunnel 140 such that the receiver of transceiver 110 may be coupled to the transmitter of transceiver 120 and the receiver of transceiver 120 may be coupled to the transmitter of transceiver 110. I/O tunnel 140 may include command and data buses used to forward packet traffic through I/O node 20. In addition, I/O node 20 includes a peripheral bus interface, implemented here as peripheral interface circuit 150. Peripheral interface circuit 150 is coupled to transceivers 110 and 120 through I/O tunnel 140. However as described above, transactions which originate at peripheral interface circuit 150 and then enter I/O tunnel 140 may be referred to as injected transactions. I/O node 20 also includes a tunnel control unit 130 which is coupled to control the transactions between transceivers 110 and 120 and peripheral interface 150. I/O node 20 is also coupled to a peripheral bus 25 through the peripheral interface circuit 150.

In the illustrated embodiment, transceivers 110 and 120 are part of two uni-directional communication paths through I/O tunnel 140. Since each of the communication paths is uni-directional, either path may be connected as the upstream or downstream path. Thus, the injected traffic from peripheral interface circuit 150 may be provided to either of transceivers 110 and 120. Transceivers 110 and 120 may each receive packet transactions into a receive buffer (not shown). As each transaction is received, a control command may be generated containing a subset of the information contained in the received command. The control command may include the Unit Id of the originating node, destination information, a data count and transaction type, for example. It is noted that the control command may include other information or may not include some of the information listed here. The control command may be sent from transceivers 110 and 120 to tunnel control unit 130. Tunnel control unit 130 may further determine which of the received transactions may be sent from a respective transceiver and to indicate to the transceiver to send the transaction to the transaction's destination.

In the illustrated embodiment, peripheral interface circuit 150 may be thought of as having a downstream section and an upstream section. The downstream section may handle downstream transactions whose destination may be a device connected to peripheral bus 25. Packets received by the downstream section may allow peripheral bus interface circuit to generate cycles on the peripheral bus, enabling communication with peripheral devices coupled to the bus. The upstream section may handle transactions which originate from devices that may be connected to peripheral bus 25. Thus, peripheral interface circuit 150 includes a downstream command buffer 160 and a downstream data buffer 170, each coupled to I/O tunnel 140 via tunnel interface logic 155. Downstream command buffer 160 and downstream data buffer 170 are each coupled to peripheral bus 25 via bus interface circuit 210.

Peripheral interface circuit 150 also includes an upstream command buffer 160 and an upstream data buffer 190, each coupled to I/O tunnel 140 via tunnel interface logic 155. Upstream command buffer 160 and upstream data buffer 170 are also each coupled to peripheral bus 25 via bus interface circuit 210. Peripheral interface circuit 150 further includes a control logic unit 200 which is coupled to both upstream command buffer 180 and downstream command buffer 160.

It is noted that in the illustrated embodiment, peripheral bus 25 is illustrative of a variety of common peripheral buses such as a PCI bus, a PCI-X bus and an AGP bus for example. Additionally, bus interface circuit 210 may include circuitry for translating peripheral bus commands from such buses. Further, it is contemplated that in one particular embodiment, bus interface circuit 210 may be a bus interface such as a Compaq™ Rapid Enabler for PCI-X (CREX) interface. Lastly, it is contemplated that in certain embodiments, I/O node 20 may include more than one peripheral interface circuit (not shown) and that I/O node may include arbitration logic (not shown) which may arbitrate between commands sent from each of the peripheral interface circuits Transactions may be sent from transceiver circuit 110 or 120 depending on which transceiver is connected as the downstream receiver. The command portion of the transaction may be stored in downstream command buffer 160 and the data portion of the transaction may be stored in downstream data buffer 170. Likewise, when a transaction is sent from bus interface circuit 210, the command portion of the transaction may be stored in upstream command buffer 180 and the data portion of the transaction may be stored in upstream data buffer 190. Control logic unit 200 may be configured to control the conveyance of the transactions to and from bus interface 210 and I/O tunnel 140.

In response to peripheral interface circuit 150 receiving upstream transactions from peripheral bus 25, control logic unit 200 may generate control commands similar to the control commands generated by transceivers 110 and 120. Control logic unit 200 may also send those control commands to tunnel control unit 130, thus allowing upstream commands to be scheduled into I/O tunnel 140. In addition, control logic unit 200 may provide downstream circuitry with signals corresponding to upstream commands which may allow the downstream circuitry to maintain the relative order of downstream response transactions.

Figure 3:
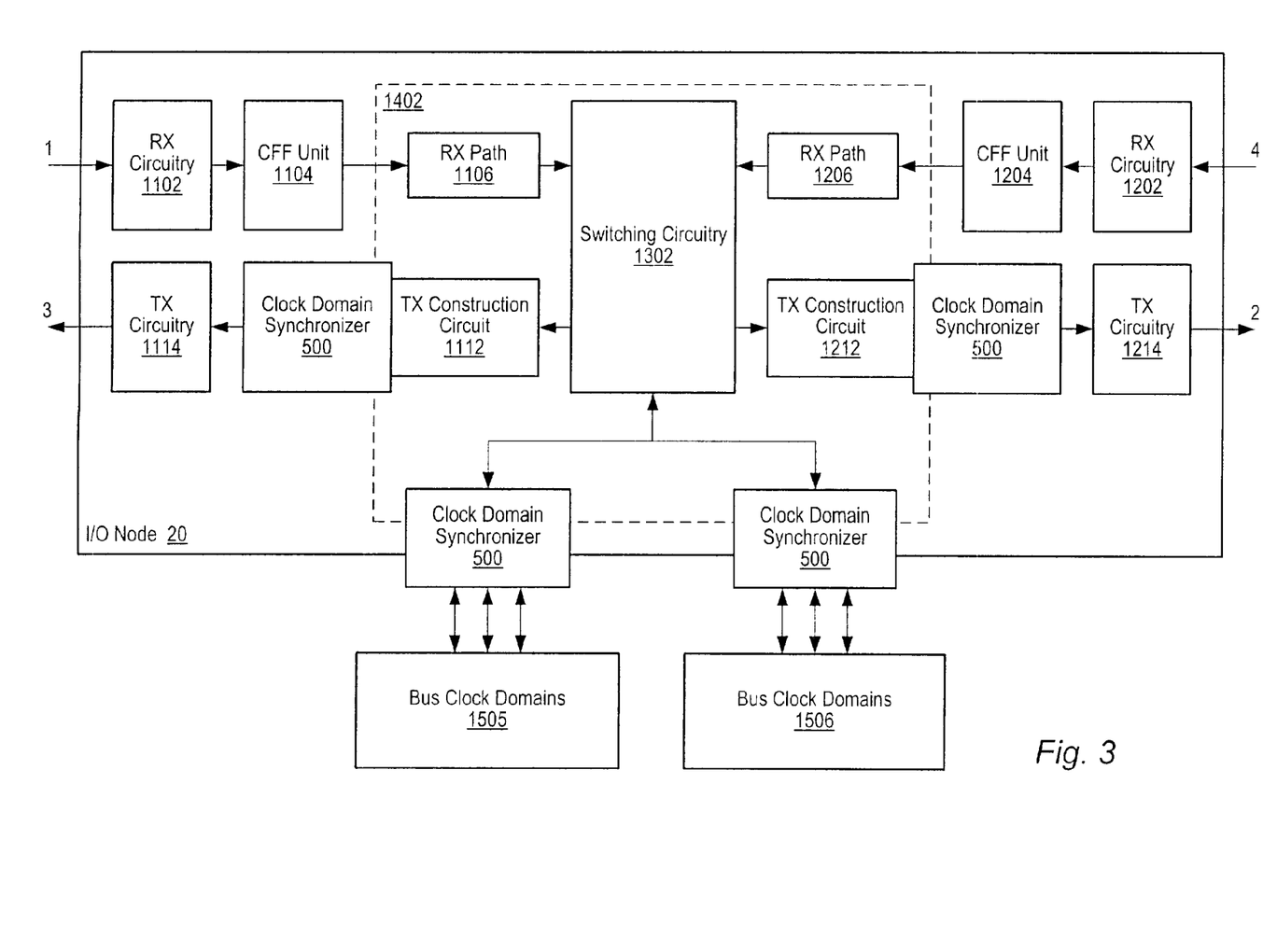
FIG. 3 is an alternate block diagram of the embodiment of the I/O node illustrated in FIG. 2, wherein the alternate block diagram illustrates the multiple clock domains.

FIG. 3 is an alternate block diagram of the embodiment of the I/O node illustrated in FIG. 2, illustrating multiple clock domains. I/O node 20 includes a plurality of clock domains, wherein each of the clock domains may be synchronized to a clock having a different frequency than adjacent clock domains. Clock domain 1402 serves as the clock domain for I/O tunnel 140. Switching circuitry 1302 may reside within clock domain 1402, and may be a component of tunnel control unit 130 shown in FIG. 2.

Data to be transmitted in packets from I/O node 20 may be conveyed from switching circuitry 1302 into one of transmit (TX) construction circuits 1112 or 1212. In the embodiment shown, TX construction circuit 1112 is a component of transceiver circuit 110, while TX construction circuit 1212 is a component of transceiver circuit 120. TX construction circuits 1112 and 1212 may be configured to organize data into packets or perform other functions necessary for transmitting information from I/O node 20. In embodiments where the width of the packet bus is less than that of buses internal to I/O node 20, TX construction circuit may perform a wide-to-narrow conversion of the packets.

Once packets are ready for transmission, it may be necessary to transfer them to the clock domain of TX circuitry 1114 or 1214. Since these transmit circuits may be in clock domains different from I/O tunnel clock domain 1402, it may be necessary to route the packets through a corresponding clock domain synchronizer 500. Clock domain synchronizers 500 may be configured to "shift" the packets into a clock domain with a faster or slower clock frequency than that of clock domain 1402. Clock domain synchronizers 500 will be discussed in further detail below.

Packets may be transmitted onto a packet bus link through TX circuitry 1114 or 1214, depending upon the link. TX circuitry 1114/1214 may include circuitry for transmitting packet signals onto a packet bus link, as well as any necessary timing circuitry. Control circuitry may also be present, as transmissions onto the packet bus may be subject to arbitration. In addition, TX circuitry 1114/1214 may further include buffers or registers in order to store packets awaiting transmission onto the packet bus.

Packetized data and commands from a packet bus link coupled to I/O node 20 may be received through receive (RX) circuitry 1102/1202, data synchronization units (shown here as CFF units 1104/1204), and RX paths 1106/1206. Switching circuitry 1302 may receive the packets from either of RX paths 1106/1206, and route the packets to a TX construction circuit 1112/1212 (for packets passing through I/O node 20 to another packet bus link) or to a peripheral bus interface, such as peripheral interface circuit 150 of FIG. 2.

In one embodiment, RX circuitry 1102/1202 may perform narrow-to-wide bus conversions. The packet bus links coupled to I/O node 20 may be narrower than the signal width of buses internal to the I/O node. Thus, RX circuitry 1102/1202 may convert packets received on a narrow packet bus link to a format suitable for a wider internal bus link.

After conversion, data and/or commands may be forwarded by RX circuitry 1102/1202 to a corresponding data synchronization unit. In the embodiment shown, the data synchronization units are clock-forwarding FIFO (first in first out) units 1104/1204. CFF units 1104/1204 may be configured to control the flow of information from the packet bus link into I/O node 20 by providing buffering and clock synchronization between clock domains. CFF units 1104/1204 may be sized to absorb dynamic variation between a transmitter's clock (external to I/O node 20) and the receiver's clock (generated internal to I/O node 20). Because of variations in manufacturing process, voltage, and temperature, it is possible for clock cycle slippage to occur between different I/O nodes in a computer system. This may occur when the transmitter clock and the receiver clock are synchronized in frequency but not in phase. CFF units 1104/1204 may absorb these variations by temporarily storing information received from RX circuitry 1102/1202 in a first in first out (FIFO) memory. This may allow for the receiving of information by I/O node 20 from a packet bus link despite any accumulated phase difference between external and internal clocks.

Each of CFF units 1104/1204 may also, in some embodiments, perform a function similar to that of the clock domain synchronizers 500. The presence of a FIFO memory in CFF units 1104/1204 may allow information to be received by a slower clock domain from a faster clock domain.

Information from each of the CFF units may pass through an RX path 1106/1206 into switching circuitry 1302. RX paths 1106/1206 may be a bus configured to convey information into the switching circuitry. The bus may be sized to match the data width of a FIFO output from CFF units 1104/1204.

I/O node 20 may also include bus clock domains 1505 and 1506. Bus clock domains 1505 and 1506 may each include a plurality of clock domains which correspond to bus interfaces. Such bus interfaces may be configured to support peripheral buses such as a peripheral component interface (PCI) bus, an advanced graphics port (AGB) bus, a general purpose instrument bus (GPIB), and any other type of peripheral bus. Internal buses may also be coupled to a bus interface in one of bus clock domains 1505/1506. Corresponding clock domain synchronizers 500, as shown in the drawing, may allow information to be transmitted between bus clock domains 1505/1506 and clock domain 1402. In the embodiment shown, bus clock domains 1505/1506 may each correspond to a peripheral bus interface such as peripheral interface circuit 150 of FIG. 2. It should also be noted that multiple clock domains may be present within each of bus clock domains 1505/1506.

Switching circuitry 1302 may perform a variety of switching functions related to the routing of information that may pass through I/O node 20. Switching circuitry 1302 may include circuitry which routes information between the bus clock domains and the transmit and receive paths shown in the drawing (made up of RX circuitry 1102/1202, TX circuitry 1114/1214, etc.).

Figure 4:
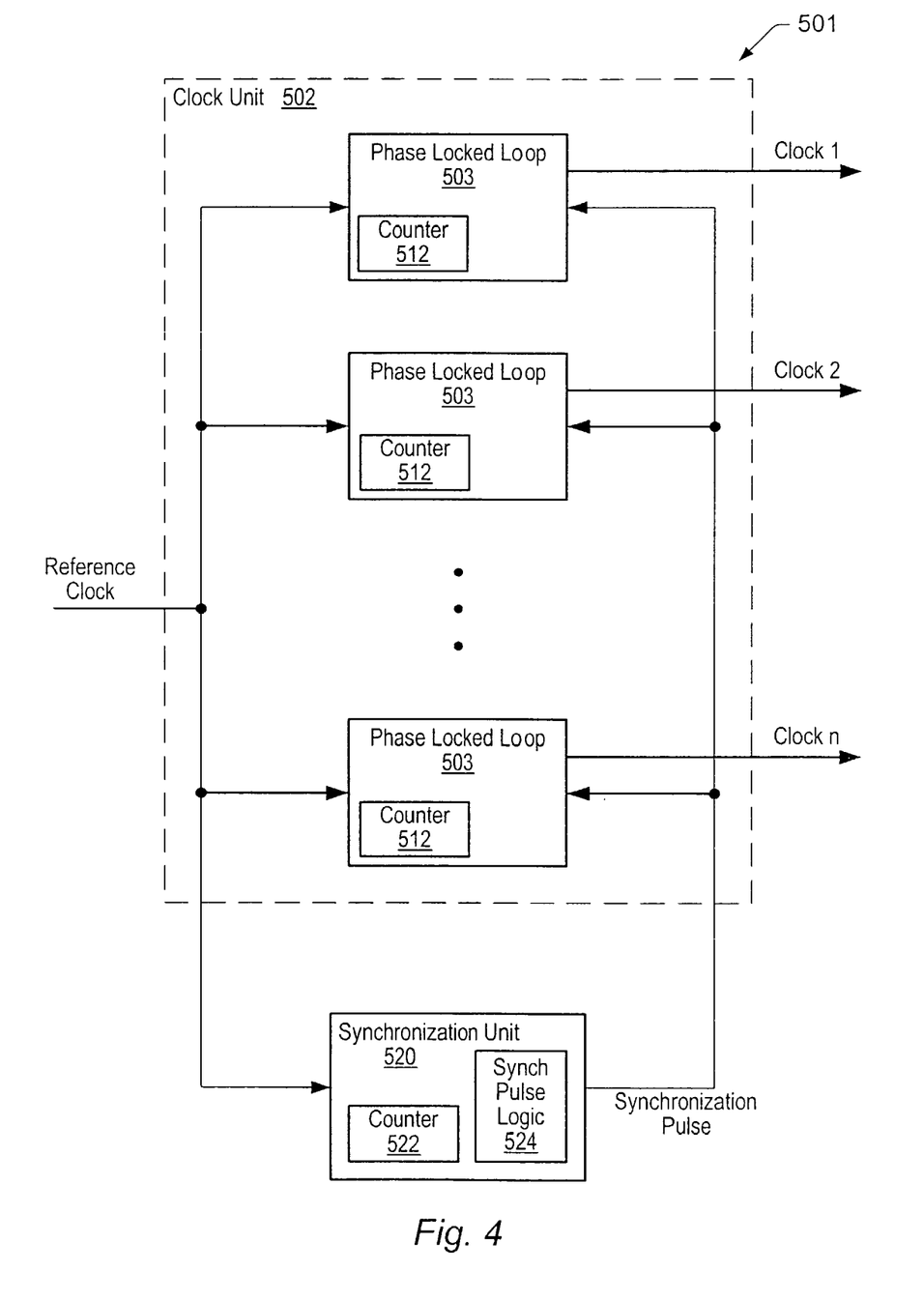
FIG. 4 is a block diagram of one embodiment of a circuit configured to perform edge synchronization for multiple clock signals.

Turning now to FIG. 4, a block diagram of one embodiment of a circuit configured to perform edge synchronization for multiple clock signals is shown. Clock circuit 501 may be a component of clock domain synchronizer 500 shown in FIG. 3. Clock circuit 501 may include a clock unit 502 and a synchronization circuit 520. Clock unit 501 may include a plurality of phase locked loops (PLLs) 503. The output of each of PLLs 503 may be a clock signal, which may be conveyed to a clock domain in the system in which clock circuit 501 is implemented (such as I/O node 20). Clock unit 502 may output n clock signals, wherein n is an integer value. There is no theoretical limit to the number of PLLs 503 that may be present in clock unit 502, and consequently, the number of clock signals which it may produce. It should also be noted that other embodiments utilizing delay locked loops (DLLs) are possible and contemplated.

Each of PLLs 503 may receive a reference clock signal, and as previously noted, produce an output clock signal. In embodiments such as I/O node 20 of FIGS. 2 and 3, the reference clock signal may be a signal produced external to the I/O node, while the output clock signals (clock 1, clock 2, etc.) may be local clock signals for one of the clock domains. The output clock signal from each of PLLs 503 may have a frequency that is greater than or less than the frequency of the reference clock signal. It may also be possible for the output clock signal of a given PLL 503 to have a frequency that is equal to the frequency of the reference clock signal.

In the embodiment shown, each of PLL 503 may be a typical PLL including a phase detector and a voltage controlled oscillator (VCO). Each PLL 503 may also include a divide-by-n counter, shown here as counter 512 in each of PLLs 503. Counters 512 may each be placed in a feedback path between the VCO and phase detector. This may enable a given PLL 503 to output a clock signal having a frequency that is a multiple of the reference clock signal. Conversely, depending upon the counter, the frequency of the output clock signal may be a fraction of the input clock signal. Thus, multiple clock signals having different frequencies may be produced by clock unit 502 using the reference clock signal as an input to each of the PLLs 503.

Synchronization unit 520 may also be configured to receive the reference clock signal, and may be further configured to drive a synchronization pulse to each of PLLs 503. In the embodiment shown, synchronization unit 520 includes counter 522 and synchronization pulse logic 524. Counter 522 may be configured to receive the reference clock signal, and may cycle through a plurality of states.

Synchronization pulse logic 524 may be coupled to counter 522 and may assert a synchronization pulse each time the counter cycles through a number of states N. In one embodiment, the assertion of the synchronization pulse may occur once every N clock cycles of the reference clock signal. The beat frequency may be defined as the frequency in which a given pattern of all of the clock cycles repeats itself relative to the reference clock signal. The beat frequency of the repeating clock patterns may be the frequency of the reference clock signal divided by N. For example, if the reference clock signal is 200 MHz, and the pattern repeats itself at 4 times relative to a cycle of the reference clock signal, then N=4 and the beat frequency is 50 MHz. Other embodiments are possible and contemplated wherein the beat frequency may be less than the frequency of the reference clock signal.

The outputs of counter 522 may be coupled to synchronization pulse logic 524. In one embodiment, synchronization pulse logic 524 may be a combinational logic circuit. When the outputs of counter 522 reach a certain state, it may cause the synchronization pulse to be asserted. The synchronization pulse may be driven to each of the PLLs 503. In addition, the synchronization pulse may be fed back to a reset input of counter 522, which may cause the counter to be reset each time the synchronization pulse is asserted.

The synchronization pulse may also be received by each counter 512 within its respective PLL 503. In particular, each counter 512 may receive the synchronization input through a reset input. Receiving the asserted synchronization pulse at the reset input may cause each of counters 512 to synchronously reset. When each of counters 512 is reset, it may cause its respective PLL 503 to attain a phase lock on a subsequent clock edge of the reference clock signal. In one embodiment, each PLL 503 may attain a phase lock on the next rising edge of the reference clock signal subsequent to the resetting of counters 512. Thus, each PLL 503 may achieve a phase lock at approximately the same time, thereby aligning the rising edges of all of the clock signals.

It should be noted that other embodiments are possible and contemplated wherein the falling edges of the clock signals are aligned instead of the rising edges. This may be true for systems having synchronous logic circuits that are triggered by a falling edge of a clock signal instead of the rising edge. Furthermore, systems having a mix of synchronous circuits triggered by either the rising edges or the falling edges of a clock signal may be configured to perform alignment of either rising edges or falling edges.

By achieving phase lock for each of PLLs 503 subsequent to the assertion of the synchronization pulse, the relationship between the clock edges may be known at a given instant. Knowledge of this relationship may be critical when information is to be transferred between clock domains wherein the respective clock signals involved have different frequencies. When information is transferred between clock domains synchronized to clock signals of different frequencies, only certain "safe" clock cycles may be suitable for information transmission. Thus, to ensure that the transmissions occur during safe clock cycles, it may be of critical importance to know the relationship between the edges of the clock signals involved. Thus, by periodically asserting the synchronization pulse, the clock edges may be aligned in a repetitious fashion during the operation of a system in which clock circuit 501 is implemented.

Figure 5:
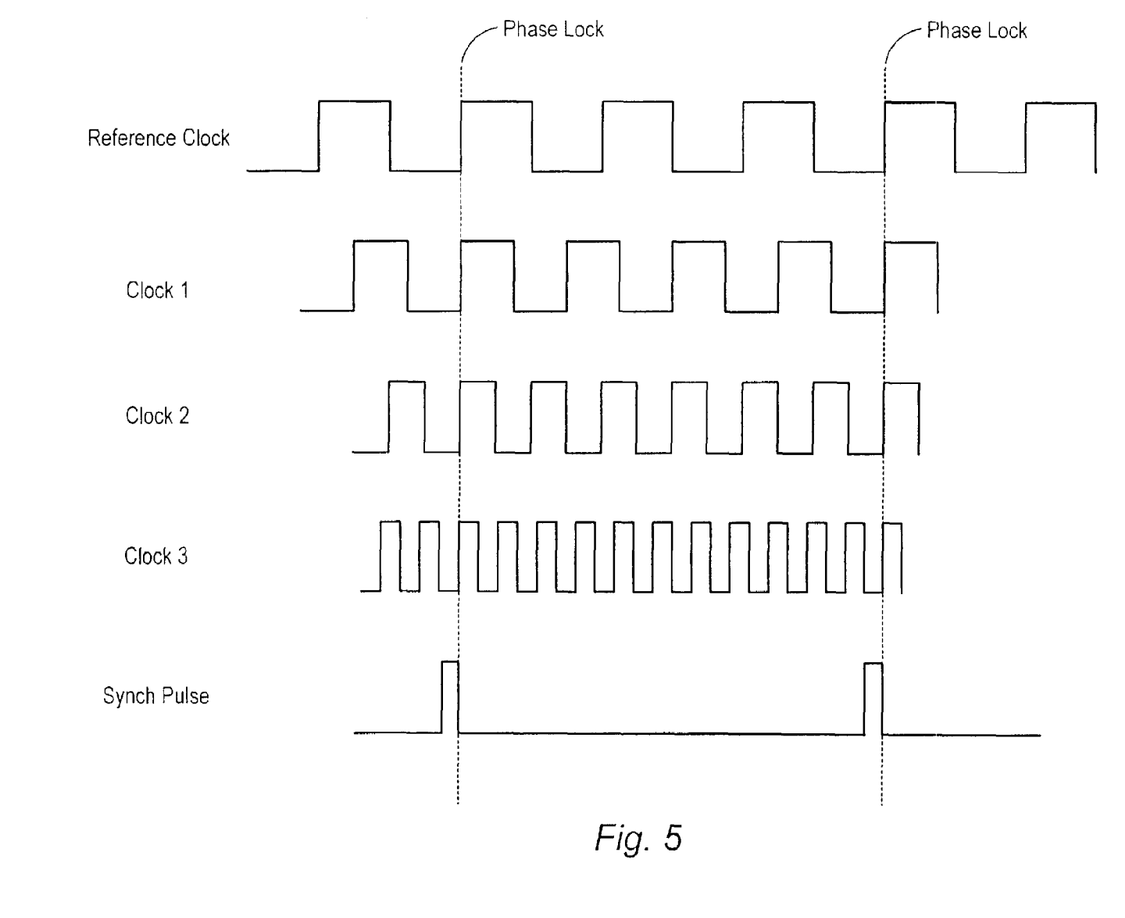
FIG. 5 is a timing diagram illustrating edge synchronization of multiple clock signals that may be performed by one embodiment of an edge synchronization circuit.

Moving now to FIG. 5, a timing diagram illustrating edge synchronization of multiple clock signals that may be performed by one embodiment of clock circuit 501 is shown. In this particular example, three clock signals (clock 1, clock 2, and clock 3) of different frequencies are generated based on a reference clock signal that may be received by a plurality of PLLs 503. Clock 1, clock 2, and clock 3 may be clock signals that are used for synchronization in a local clock domain. Although each of the clock signals shown here has a higher frequency than the reference clock signal, it is possible and contemplated that some embodiments will include clock signals having a frequency lower than the reference clock signal.

The frequency at which the synch pulse is asserted may be dependent upon the relationship between the reference clock signal and the beat frequency. In this example, the beat frequency is 1/3 that of the reference clock frequency, and thus, N=3. Therefore, counter 522 in synchronization unit 520 (as shown in FIG. 4) may cycle through three different states for each synchronization pulse assertion. When the third state is reached, synchronization pulse logic 524 may assert the synchronization pulse. It should be noted that synchronization pulse logic 524 may include additional circuitry which may limit the width of the synchronization pulse. This may prevent the resetting and suppression of clock signals having a higher frequency than the reference clock signal.

When the synchronization pulse is asserted, each of the PLL counters 512 may be synchronously reset. After resetting each of the counters 512, each PLL 503 will attempt to achieve a phase lock with the reference clock signal. Typically, each PLL 503 will attain the phase lock at the as the reference clock reaches its rising edge. As a result, the rising edge of each of the output clock signals may be aligned with the rising edge of the reference clock signal, as the reset and subsequent phase lock forces these clock edges into alignment. As such, the phase relationship between each of the clock signals may be known at that particular instance. Furthermore, the rising edges of the output clock signals may be aligned in a repeated fashion (every third rising edge in this example). This may allow the phase relationship of the clock signals to be known for a majority of the time a system is operating.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system for synchronizing clock signals, the system comprising:
   a clock unit, wherein the clock unit is coupled to receive a reference clock signal and to output a plurality of domain clock signals, wherein each of the domain clock signals has a different frequency with respect to the other domain clock signals, the clock unit including a plurality of domain clock units each configured to provide a corresponding one of the domain clock signals;
   a synchronization unit, wherein the synchronization unit is configured to receive the reference clock signal, wherein the synchronization unit is configured to assert and provide, to each of the plurality of domain clock units of the clock unit, a synchronization pulse at a rate equivalent to a beat frequency of the plurality of domain clock signals, the beat frequency being a frequency in which a given cyclic pattern of the plurality of domain clock signals repeats itself with respect to the reference clock signal, and wherein the clock unit is configured to align with each other clock signal edges of the plurality of domain clock signals and the reference clock signal responsive to receiving the synchronization pulse.

2. The system as recited in claim 1, wherein each of the plurality of domain clock units is a phase locked loop (PLL), and wherein each of the PLLs is coupled to receive the reference clock signal.

3. The system as recited in claim 2, wherein each of the plurality of PLLs is configured to receive the synchronization pulse.

4. The system as recited in claim 3, wherein each of the plurality of PLLs includes a counter, and wherein the counter is reset responsive to asserting the synchronization pulse.

5. The system as recited in claim 2, wherein at least one of the plurality of PLLs is configured to output a domain clock signal having a frequency greater than that of the reference clock signal.

6. The system as recited in claim 2, wherein at least one of the plurality of PLLs is configured to output a domain clock signal having a frequency less than that of the reference clock signal.

7. The system as recited in claim 1, wherein the synchronization unit includes a counter, wherein the counter is configured to receive the reference clock signal.

8. The system as recited in claim 7, wherein the counter is configured to sequentially produce N different states, and wherein the beat frequency is a frequency of the reference clock signal divided by N.

9. The system as recited in claim 1, wherein each of the plurality of domain clock units is a delay locked loop (DLL), and wherein each of the DLLs is coupled to receive the reference clock signal.

10. The system as recited in claim 9, wherein each of the plurality of DLLs is configured to receive the synchronization pulse.

11. The system as recited in claim 10, wherein each of plurality of the DLLs includes a counter, and wherein an assertion of the synchronization pulse causes the counter to reset.

12. The system as recited in claim 9, wherein at least one of the plurality of DLLs is configured to output a domain clock signal having a frequency that is greater than the frequency of the reference clock signal.

13. The system as recited in claim 9, wherein at least one of the plurality of DLLs is configured to output a domain clock signal having a frequency that is less than the frequency of the reference clock signal.

14. The system as recited in claim 1, wherein the clock signal edges are rising edges.

15. The system as recited in claim 1, wherein the clock signal edges are falling edges.

16. A method for synchronizing clock signals, the method comprising:
   receiving a reference clock signal, wherein the reference clock signal is received by a clock unit and a synchronization unit, wherein the clock unit is configured to output a plurality of domain clock signals, and wherein each of the domain clock signals has a different frequency with respect to the other domain clock signals, wherein the clock unit includes a plurality of domain clock units each configured to provide a corresponding one of the domain clock signals;
   asserting a synchronization pulse, wherein the synchronization pulse is asserted by the synchronization unit, and wherein the synchronization pulse is asserted at a rate equivalent to a beat frequency of the plurality of the domain clock signals, the beat frequency being a frequency in which a given cyclic pattern of the plurality of domain clock signals repeats itself with respect to the reference clock signal;

the plurality of domain clock units of the clock unit receiving the synchronization pulse; and aligning, with each other, clock signal edges of the plurality of domain clock signals and the reference clock signal responsive to said receiving the synchronization pulse.

17. The method as recited in claim 16, wherein each of the plurality of domain clock units is a phase locked loop (PLL), and wherein each of the PLLs is coupled to receive the reference clock signal.

18. The method as recited in claim 17, wherein each of the plurality of PLLs is configured to receive the synchronization pulse.

19. The method as recited in claim 18, wherein each of the plurality of PLLs includes a counter, and wherein the counter is reset responsive to said asserting the synchronization pulse.

20. The method as recited in claim 17, wherein at least one of the plurality of PLLs is configured to output a domain clock signal having a frequency greater than that of the reference clock signal.

21. The method as recited in claim 17, wherein at least one of the plurality of PLLs is configured to output a domain clock signal having a frequency less than that of the reference clock signal.

22. The method as recited in claim 16, wherein the synchronization unit includes a counter, wherein the counter is configured to receive the reference clock signal.

23. The method as recited in claim 22, wherein the counter is configured to sequentially produce N different states, and wherein the beat frequency is a frequency of the reference clock signal divided by N.

24. The method as recited in claim 16, wherein each of the plurality of domain clock units is a delay locked loop (DLL), and wherein each of the plurality of DLLs is coupled to receive the reference clock signal.

25. The method as recited in claim 24, wherein each of the plurality of DLLs is configured to receive the synchronization pulse.

26. The method as recited in claim 25, wherein each of the plurality of DLLs includes a counter, and wherein an assertion of the synchronization pulse caused the counter to reset.

27. The method as recited in claim 24, wherein at least one of the plurality of DLLs is configured to output a domain clock signal having a frequency that is greater than that of the reference clock signal.

28. The method as recited in claim 24, wherein at least one of the plurality of DLLs is configured to output a domain clock signal having a frequency that is less than that of the reference clock signal.

29. The method as recited in claim 16, wherein the clock signal edges are rising edges.

30. The method as recited in claim 16, wherein the clock signal edges are falling edges.

31. An I/O node comprising:

a first transceiver unit and a second transceiver unit comprising a first clock domain and a second clock domain, respectively;

an I/O tunnel, the I/O tunnel comprising a third clock domain;

a plurality of clock domain synchronizers, including first and second clock domain synchronizers coupling the I/O tunnel to the first transceiver unit and the second transceiver unit, respectively, wherein each of the plurality of clock domain synchronizers includes:

a clock unit, wherein the clock unit is coupled to receive a reference clock signal and to output a plurality of domain clock signals, wherein each of the domain clock signals has a different frequency with respect to the other domain clock signals, the clock unit including a plurality of domain clock units each configured to provide a corresponding one of the domain clock signals;

a synchronization unit, wherein the synchronization unit is configured to receive the reference clock signal, wherein the synchronization unit is configured to assert and provide, to each of the plurality of domain clock units of the clock unit, a synchronization pulse at a rate equivalent to a beat frequency of the plurality of domain clock signals, the beat frequency being a frequency in which a given cyclic pattern of the plurality of domain clock signals repeats itself with respect to the reference clock signal, and wherein the clock unit is configured to align with each other clock signal edges the plurality of the domain clock signals and the reference clock signal responsive to receiving the synchronization pulse.

32. The I/O node as recited in claim 31, wherein each of the plurality of domain clock units is a phase locked loop, and wherein each of the PLLs is coupled to receive the reference clock signal.

33. The I/O node as recited in claim 32, wherein each of the plurality of PLLs is configured to receive the synchronization pulse.

34. The I/O node as recited in claim 33, wherein each of the plurality of PLLs includes a counter, and wherein the counter is reset responsive to asserting the synchronization pulse.

35. The I/O node as recited in claim 32, wherein at least one of the plurality of PLLs is configured to output a domain clock signal having a frequency greater than that of the reference clock signal.

36. The I/O node as recited in claim 32, wherein at least one of the plurality of PLLs is configured to output a domain clock signal having a frequency less than that of the reference clock signal.

37. The I/O node as recited in claim 31, wherein the synchronization unit includes a counter, wherein the counter is configured to receive the reference clock signal.

38. The I/O node as recited in claim 37, wherein the counter is configured to sequentially produce N different states, and wherein the beat frequency is a frequency of the reference clock signal divided by N.

39. The I/O node as recited in claim 31, wherein each of the plurality of domain clock units is a delay locked loop (DLL), and wherein each of the DLLs is coupled to receive the reference clock signal.

40. The I/O node as recited in claim 39, wherein each of the plurality of DLLs is configured to receive the synchronization pulse.

41. The I/O node as recited in claim 40, wherein each of plurality of the DLLs includes a counter, and wherein an assertion of the synchronization pulse causes the counter to reset.

42. The I/O node as recited in claim 39, wherein at least one of the plurality of DLLs is configured to output a domain clock signal having a frequency that is greater than the frequency of the reference clock signal.

43. The I/O node as recited in claim 39, wherein at least one of the plurality of DLLs is configured to output a domain clock signal having a frequency that is less than the frequency of the reference clock signal.

44. The I/O node as recited in claim 31, wherein the clock signal edges are rising edges.

45. The I/O node as recited in claim 31, wherein the clock signal edges are falling edges.

46. The I/O node as recited in claim 31, wherein the first transceiver unit is configured to be coupled to a first packet bus link, and wherein the second transceiver unit is configured to be coupled to a second packet bus link.

47. The I/O node as recited in claim 31, wherein the I/O node includes a peripheral bus interface configured to be coupled to a peripheral bus, wherein the peripheral bus interface comprises a fourth clock domain.

48. The I/O node as recited in claim 47, wherein the plurality of clock domain synchronizers includes a third clock domain synchronizer, wherein the peripheral bus interface is coupled to the I/O tunnel by the third clock domain synchronizer.

* * * * *